United States Patent
Sonntag et al.

(10) Patent No.: US 9,017,579 B2
(45) Date of Patent: Apr. 28, 2015

(54) CARBON-BASED MATERIALS DERIVED FROM LATEX

(75) Inventors: Philippe Sonntag, Hericy (FR); David Ayme-Perrot, Barthenheim (FR); Jean-Michel Simon, Chatillon (FR); Serge Walter, Soppe le Haut (FR)

(73) Assignee: Hutchinson, Paris (FR)

(*) Notice: Subject to any disclaimer, the term of this patent is extended or adjusted under 35 U.S.C. 154(b) by 1218 days.

(21) Appl. No.: 12/934,243

(22) PCT Filed: Mar. 26, 2009

(86) PCT No.: PCT/FR2009/000332
§ 371 (c)(1),
(2), (4) Date: Feb. 18, 2011

(87) PCT Pub. No.: WO2009/125094
PCT Pub. Date: Oct. 15, 2009

(65) Prior Publication Data
US 2011/0140051 A1 Jun. 16, 2011

(30) Foreign Application Priority Data

Mar. 26, 2008 (FR) .................................. 08 01639

(51) Int. Cl.
| | |
|---|---|
| H01B 1/24 | (2006.01) |
| H01B 1/04 | (2006.01) |
| B82Y 30/00 | (2011.01) |
| C08L 61/06 | (2006.01) |
| C08L 21/00 | (2006.01) |
| C08C 19/00 | (2006.01) |
| C08L 61/12 | (2006.01) |
| C04B 35/524 | (2006.01) |
| C04B 35/532 | (2006.01) |
| C08G 8/22 | (2006.01) |
| C08J 3/24 | (2006.01) |
| C04B 38/00 | (2006.01) |
| C04B 111/00 | (2006.01) |
| C08L 9/02 | (2006.01) |
| C08L 13/00 | (2006.01) |
| C08L 21/02 | (2006.01) |

(52) U.S. Cl.
CPC .............. *C08L 61/12* (2013.01); *C08J 2313/02* (2013.01); *C08J 2321/02* (2013.01); *H01B 1/04* (2013.01); *C08L 2666/16* (2013.01); *C08J 2309/04* (2013.01); *H01B 1/24* (2013.01); *C04B 38/0051* (2013.01); *C08L 2666/04* (2013.01); *C04B 35/524* (2013.01); *C04B 35/532* (2013.01); *C04B 38/0032* (2013.01); *C04B 2111/00853* (2013.01); *C04B 2235/425* (2013.01); *C08G 8/22* (2013.01); *C08J 3/246* (2013.01); *C08J 2309/02* (2013.01); *C08J 2313/00* (2013.01); *C08J 2321/00* (2013.01); *C08J 2361/12* (2013.01); *C08L 9/02* (2013.01); *C08L 13/00* (2013.01); *C08L 21/00* (2013.01); *C08L 21/02* (2013.01)

(58) Field of Classification Search
None
See application file for complete search history.

(56) References Cited

FOREIGN PATENT DOCUMENTS

| FR | 961294 | 1/1948 |
|---|---|---|
| FR | 1097512 | 4/1954 |
| WO | WO 2007/024241 A2 | 3/2007 |

OTHER PUBLICATIONS

Guo, Tianying, et al.; "Novel monolithic mesoporous foamed carbons prepared using micro-colloidal particles as templates"; Journal of Non-Crystalline Solids; 353; 2007; pp. 2893-2899.
Li, Wen-Cui, et al.; "Characterization of the microstructures of organic and carbon aerogels based upon mixed cresol-formaldehyde"; Carbon; 39; 2001; pp. 1989-1994.
Lukens, Wayne W., et al.; "Synthesis of Mesoporous Carbon Foams Templated by Organic Colloids"; Chemistry of Materials; 14; 2002; pp. 1665-1670.
Rahrig, Douglas B.; "Dynamic Mechanical and Thermal Analysis for the Determination of RFL Morphology"; The Journal of Adhesion; vol. 16; 1984; pp. 179-215.
Search Report and Written Opinion for International Application No. PCT/FR2009/000332, dated Oct. 15, 2009; 10 pages.

*Primary Examiner* — Harold Pyon
*Assistant Examiner* — Tanisha Diggs
(74) *Attorney, Agent, or Firm* — Alston & Bird LLP (57) ABSTRACT

Organic gels of resorcinol-formaldehyde type, carbon-based materials of adjusted porosity derived therefrom by pyrolysis. Such materials may be used, in particular, for the production of electrodes.

16 Claims, 3 Drawing Sheets

CARBON-BASED MATERIALS DERIVED FROM LATEX

This is an application filed under 35 U.S.C 371 of PCT/FR09/00332, filed Mar. 26, 2009, which claims priority from France Application 0801639, filed Mar. 26, 2008.

FIELD OF THE INVENTION

A subject matter of the invention is novel organic gels of the resorcinol/formaldehyde type ("RF gels") and the carbon-based materials of tailored porosity deriving therefrom by pyrolysis. Such materials can be used in particular for the production of electrodes.

BACKGROUND OF THE INVENTION

The document WO 2007/024241 describes a process for the manufacture of a porous carbon-based material. According to this process, a mixture of a carbon-based precursor, such as a resorcinol, for example, and a block polymer is formed in order to form a structured material. The carbon-based precursor is then crosslinked with formaldehyde and then the combined product is pyrolyzed. A carbon-based material having an organized nanostructure is obtained, the pores of which have a uniform size which can vary from 4 to 100 nm.

However, this process is carried out in an organic medium, which presents problems of pollution, this synthesis is complicated due to problems of miscibility between the components, it is expensive and has a low yield. Finally, the products obtained are not entirely satisfactory.

The document Chem. Mater., 2002, 14, 1665-1670, describes the production of mesoporous carbon-based materials. The process uses polystyrene microspheres as a mixture with an aqueous suspension of a resorcinol/formaldehyde resin. The polystyrene latex brings about the formation of pores with sizes ranging from 50 to 100 nm, which results in a low full capacitance.

The document FR-1 097 512 describes a process for the manufacture of sponges based on latex and on resorcinol/formaldehyde resin. The latex and the resin are mixed with various additives and then the mixture is gelled and vulcanized.

The document FR-0 961 294 relates to a process for strengthening latex mixtures. The latex is mixed with a resin and then gelled and dried.

The document J. Adhesion, 1984, vol. 16, p. 179-216, relates to adhesive compositions based on latex and on resorcinol/formaldehyde mixture. It is a study on the structure of these materials and on their fundamental properties.

The document Journal of Noncrystalline Solids, 353 (2007), 2893-2899, describes a carbon-based material prepared from a resorcinol/formaldehyde resin and from a PMMA latex. In a first step, a gel is formed and is dried and then pyrolyzed. The latex makes it possible to bring about a mesoporous structure in the carbon-based material. The presence of a graphite structure is mentioned but the X-ray spectrum does not make it possible to detect such a structure.

The document U.S. Pat. No. 4,873,218 describes xerogels of RF type of low density and their pyrolysis, resulting in carbon foams also of low density. These xerogels are intended for use as sound and/or heat insulator, in applications in high-energy physics or in catalysis, or in producing ion-exchange resins.

These materials are prepared by a process comprising the mixing of the reactants and their polymerization using a basic catalyst in aqueous medium, an exchange of solvent with an organic solvent and a drying operation in a supercritical $CO_2$ medium. Such a process has a very high cost and is difficult to adapt to the industrial scale, in particular because it supposes the use of very large amounts of organic solvents.

In addition, the materials obtained after pyrolysis have a very high porosity (and thus a low density), which is reflected by relatively unsatisfactory conducting properties.

Various improvements to this process and to these materials have been proposed:

Convective drying, which generates RF xerogels (C. Lin and A. Ritter, Carbon, 35 (1997), 1271), followed by a pyrolysis, results in carbon xerogels, which are particularly advantageous as, on the one hand, the convective drying exhibits the advantage of being simple and inexpensive and, on the other hand, the materials retain very good structural and textural characteristics which allow them to be used in the powder form (C. Lin et al., J. Electrochem. Soc., 146 (1999), 3639) or as monoliths (N. Job et al., Carbon, 43 (2005), 2481).

The variation in certain parameters of the synthesis (pH, content of reactant, and the like) or postsynthesis (physical or chemical activations) makes it possible to adjust and to control the final structural, textural and mechanical properties (specific surface, porous volume, density, and the like) of the carbon xerogels (E. J. Zanto et al., Ind. Eng. Chem. Res., 41 (2002), 3151).

Some additives (inorganic salts) have been used during the formulation of the precursor gels in order to optionally modify the surface composition of the final porous carbons (N. Job et al., Carbon, 42 (2004), 3217).

WO 01/19904 describes a mesoporous carbon-based material prepared by polymerization of a resorcinol/formaldehyde system in the presence of a surfactant, followed by treatment of the gel obtained by pyrolysis. The applications concerned are the production of supercapacitor electrodes and chromatography resins.

However, the specific capacitance of the materials described in the prior art can be further improved.

The specific capacitance measured in the documents of the prior art (in particular WO 01/19904) is calculated with respect to the dry weight of the material. This method of calculation is nevertheless unsatisfactory as it is not representative of the performance of the material when it is employed as electrode.

SUMMARY OF THE INVENTION

A better balance between the quantitative numerical evaluation and the reality of the performance can be obtained by the evaluation of the full capacitance by weight of the material, which takes into account the pore volume of this material.

One of the objects which is achieved by the invention is the production of materials resulting from a gel of RF type after a pyrolysis stage, these materials having a full capacitance by weight which is greater than that of the materials of the prior art. In addition, another goal has been to obtain carbon-based materials having a graphite structure. Amorphous carbon exhibits a low conductivity. In the manufacture of electrodes for capacitors, the amorphous carbon usually has to be mixed with graphite carbon or metal particles in order to increase its conductivity. The advantage of having a partially graphitized structure is thus that of reducing the resistivity of the monolithic carbon obtained by a simple process not requiring mixing.

These materials, their processes of preparation and their uses are described below.

This object could be achieved in particular by virtue of a control of the porosity which makes it possible to obtain carbon-based materials having a porosity different from that of the materials of the prior art.

The porous materials are characterized by the size of the pores which they comprise.

The materials having pore diameters of less than 2 nm are "microporous". Those having pore diameters of between 2 and 50 nm are "mesoporous". Finally, the materials having pores with a diameter of greater than 50 nm are described as macroporous.

The process described in WO 01/19904 results in essentially mesoporous carbon-based materials, the choice of pores of this type supposedly making it possible to optimize the capacitance by weight of the material.

The present invention is based on the observation that a carbon-based material having a controlled porosity comprising a network of pores, a portion of which is mesoporous and the overall pore volume of which is reduced, makes it possible to improve the performance of these materials with respect to the materials of the prior art when they are used in particular as electrodes.

In addition, a large portion of the carbon-based materials of the prior art exhibit a limited mechanical strength which does not allow them to be machined. In order to produce electrodes from such materials, it is necessary first of all to reduce them to a powder which is subsequently compressed as a mixture with a binder, generally a fluoropolymer. As the binder is a nonconductive material, the capacitance by weight of such electrodes is limited and lower than that of the carbon-based material itself, if it was in the form of a monolith.

The aim has thus been to develop a material which simultaneously has a high density and thus a high mechanical strength and also a high full capacitance by weight. The invention relates in particular to a machinable monolithic carbon-based material.

An attempt has also been made to find products and processes which are economic, which are simple to implement and which can be applied on the industrial scale.

DETAILED DESCRIPTION OF THE INVENTION

A subject matter of the invention is gels formed of polymers of controlled porosity, their process of preparation and their use in producing monolithic carbon-based materials having a high mechanical strength, a high full capacitance by weight and thus a high conductivity. The invention has as subject matter electrodes obtained from these carbon-based materials.

A first subject matter of the invention is a gel of at least one hydrophilic polymer and of at least one latex, the polymer and the latex being cocrosslinked.

The term "gel" is understood to mean the mixture of a colloidal material and of a liquid which is formed spontaneously or under the action of a catalyst by the flocculation and coagulation of a colloidal solution.

A further subject matter of the invention is a xerogel of at least one hydrophilic polymer and of at least one latex, the polymer and the latex being cocrosslinked.

The term "xerogel" is understood to mean a gel, the volatile solvent of which has left in order to give a harder structure with reduced volume.

The term "hydrophilic polymer" is understood to mean either a water-soluble polymer or a water-dispersible polymer.

The term "water-soluble polymer" is understood to mean a polymer which can be dissolved in water without addition of additives (in particular surfactants).

A water-dispersible polymer is a polymer capable of forming a dispersion when it is mixed with water.

The water-soluble or water-dispersible character of a polymer can vary according to various parameters, such as the temperature and the pH of the water.

Mention may be made, among the polymers which can be used in the present invention, of the following systems: hydroquinone/resorcinol/formaldehyde, phloroglucinol/resorcinol/formaldehyde, catechol/-resorcinol/formaldehyde, polyvinyl chloride, phenol/formaldehyde, polyamino-phenol/benzaldehyde, epoxy phenol/formaldehyde, phenol/benzaldehyde, oxidized polystyrene, polyfurfuryl alcohol, polyvinyl alcohol, polyacrylonitrile, polyvinylidene chloride, cellulose, polybutylene, cellulose acetate, melamine/formaldehyde, polyvinyl acetate, ethyl cellulose, epoxy resins, acrylonitrile/styrene, polystyrene, polyamide, polyisobutylene, polyethylene, polymethyl methacrylate and divinylbenzene/styrene.

Preferably, the polymers used in the invention are polymers of the polyhydroxybenzene/formaldehyde type, that is to say polymers resulting from the polycondensation of at least one monomer of the polyhydroxybenzene type and at least one formaldehyde monomer.

This polymerization reaction can involve more than two distinct monomers, the additional monomers being or not being of the polyhydroxybenzene type.

The polyhydroxybenzenes which can be used for the implementation of the invention are preferably di- or trihydroxybenzenes, and advantageously resorcinol (1,3-dihydroxybenzene) or the mixture of resorcinol with another compound chosen from catechol, hydroquinone or phloroglucinol.

The polymer system, preferably a resorcinol/formaldehyde system, is mixed with a latex.

The term "latex" is understood to mean an aqueous dispersion of an elastomer. Advantageously, according to the invention, use is made of a latex with a pH of between 3 and 7.5, advantageously between 5.5 and 7.5.

Preferably, the latex is a nitrogen-based latex, that is to say a latex carrying nitrogen-based functional groups, such as nitrile, azo, amine or amide functional groups.

Advantageously, the nitrogen-based latex is characterized by an amount of nitrogen-based monomers which represents between 2 and 90 mol % with respect to the combined monomers of the latex. These amounts are evaluated with regard to the active material, the water in which the latex is dispersed being excluded.

According to the invention, the latex can be a mixture of at least two latexes, a nitrogen-based latex and a non-nitrogen-based latex. Advantageously, the nitrogen-based latex represents from 5 to 100% by weight of the weight of latex.

Mention may be made, among the latexes which can be used in the invention, of: nitrile rubbers, copolymers of acrylonitrile and of butadiene (NBR), hydrogenated copolymers of acrylonitrile and of butadiene (HNBR), copolymers of styrene and of acrylonitrile (SAN), terpolymers of acrylonitrile, of butadiene and of styrene (ABS), terpolymers of styrene, of acrylonitrile and of styrene (SAS) or polyurethane elastomers. These polymers can be in the form of a latex or optionally of a suspension of particles or of fibers. They may or may not be partially precrosslinked and they may be in the form of microgels.

Such products are available commercially under the following references: Nipol®, Lipolan® or Perbunan-N®. The hydrogenated NBR (HNBR), carboxylated NBR(XNBR) and HXNBR products are manufactured by Polymer Latex, Lanxess, Sumitomo and Nippon Zeon.

The styrene/acrylonitrile (SAN) latexes are described in Colloid and Polymer Science (1975), vol. 253, pp. 538-54, and the SAN butadiene styrene core/shell latexes are described in U.S. Pat. No. 6,753,382.

It is possible to add, to this gel or xerogel composition, other compounds which have a high level of pyrolysis residues, such as polymers based on carbohydrates (cellulose, hemicellulose, rayon, polysaccharides), polyacrylonitriles (in the form of suspensions or of fibers) or amic acid polyimides (Torlon® Ai10, sold by Solvay in solution).

In the gel or the xerogel of the invention, the components are present in the following amounts:

The molar ratio of the polyhydroxybenzene, denoted R, which is preferably resorcinol, to the formaldehyde, denoted F, is $0.4 \leq R/F \leq 0.6$, preferably $0.45 \leq R/F \leq 0.55$. Advantageously, $R/F \approx 0.5$.

The ratio by weight of the latex particles ($W_L$) to the sum of all the constituents $W_L+W_R+W_F$, with $W_R$=weight of polyhydroxybenzene (preferably resorcinol) and $W_F$=weight of formaldehyde, is within the following limits:

$$0.1 \leq \frac{W_L}{W_L + W_R + W_F} \leq 95\%,$$

preferably, this ratio is between 1 and 40%, more preferably still between 1 and 30% and advantageously between 2 and 15%, so as to promote the increase in density of the product and thus its mechanical strength.

In this calculation, the weight of the particles of the latex $W_L$ is evaluated without solvent. The weight of the latex particles is calculated by deducting the weight of water from the total weight of the latex dispersion.

An additional subject matter of the invention is a process for the manufacture of a xerogel of at least one hydrophilic polymer and of at least one latex which are cocrosslinked, as described above, this process comprising the stages of:
(i) mixing, in aqueous solution, the monomers participating in the composition of the hydrophilic polymer;
(ii) introducing the latex and mixing;
(iii) adding a basic aqueous solution, so as to adjust the pH to a value of between 5.5 and 7.5;
(iv) gelling, preferably by heating;
(v) drying.

The mixture of the monomers in step (i) is made in the proportions indicated above. The total amount of water (including the water of the latex and of the optional additives) is chosen in order to have a ratio by weight $W_R/W_W \leq 1.4$, with $W_R$ the weight of the monomers of polyhydroxybenzene type (preferably resorcinol) and $W_W$ the weight of water.

Optionally, provision may be made to replace a portion of the water with a water-miscible solvent, such as: methanol, ethanol, isopropanol, acetone, acetonitrile, dimethylformamide, dimethyl sulfoxide, dioxane, tetrahydrofuran or hexamethylphosphoramide. The amount of organic solvent is advantageously less than 20% by weight, with respect to the total weight of solvent.

Jointly with the introduction of the latex or before stage (iii), it is possible to provide for the addition, to the mixture, of one or more additives which can be chosen from: metal particles, surfactants, inorganic or organic fillers, aerogels or viscosifying agents.

Mention may be made, among metal particles, of lithium salts or boron salts.

The choice may be made, among surfactants, of a cationic, nonionic or anionic surfactant, such as, for example, a quaternary ammonium, an alkyl sulfate or an alkylsulfonate, or a polyethylene oxide).

Mention may be made, among aerogels, of the products described in U.S. Pat. No. 5,508,341, which are in the form of microspheres, or those described in U.S. Pat. No. 4,873,218, which are introduced in the powder form.

Mention may be made, among inorganic or organic fillers, of: carbon black, carbon nanotubes, aluminum, nickel, palladium or platinum particles, hollow glass beads or silica particles covered with a metal.

Mention may be made, among viscosifying agents, of polyethylene glycols.

The basic aqueous solution is advantageously a solution of an inorganic base, such as a carbonate. For example, use may be made of a 1M $Na_2CO_3$ solution.

The change in the pH to a value of between 5.5 and 7.5, accompanied or followed by a heating operation, results in the formation of a gel. The heating is advantageously carried out at constant volume, preferably under pressure, for example by transferring into an oven in a closed container. On the industrial scale, the heating can be carried out at controlled pressure. The duration of the heating is advantageously from 24 to 72 hours and the temperature is between 70 and 90° C.

The gel thus obtained is then dried. Various drying methods can be envisaged: either by heating under gas stream so as to promote the evaporation (convective drying), or by lyophilization or drying in a supercritical $CO_2$ medium.

Preferably, the choice is made to apply convective drying, which is the cheaper.

A xerogel of hydrophilic polymer and of latex, preferably a resorcinol-formaldehyde (RF)/latex xerogel, is then obtained.

The process of the invention, in contrast to the processes of the prior art, makes it possible to obtain xerogels of high density, in particular with a density greater than or equal to 1.5.

A xerogel of the invention differs from the xerogels of the prior art by the presence of nitrogen-based functional groups when the latex itself carries nitrogen-based functional groups.

Such a material has the appearance of a gel; it can be used as sound or heat insulating material.

Another subject matter of the invention is a carbon-based material capable of being obtained by pyrolysis of the xerogel of the invention.

The carbon-based material of the invention is a monolith formed of carbon comprising graphite.

Graphite is an allotropic form of carbon characterized by layers of atoms in a hexagonal arrangement.

Advantageously, the carbon-based material of the invention comprises from 0.1 to 20% by weight, preferably from 0.5 to 10% by weight, of graphite, with respect to the total weight of the material.

The presence of graphite can be observed by X-ray analysis and the presence of the following peaks is observed in particular in the X-ray diffraction spectrum measured on a diffractometer in θ-θ configuration equipped with a copper anticathode, expressed in terms of Bragg 2θ angle:

2θ angle
26.2 (*)
54.4 (*)
56.1 (**)
** values ±0.5°
*value ±1°

The carbon spectra obtained exhibit peaks which are shifted with respect to pure graphite. The spectra can also exhibit peaks at 61°, 75°, 79° and 81.5° and these are values to ±1°.

The amplitude of the peaks varies in proportion to the amount of graphite present and it is sufficient for the three peaks corresponding to the angles of less than 60° to be present in order to characterize the presence of graphite.

The material of the invention is additionally characterized by a density of between 0.5 and 1.5, preferably between 0.7 and 1.2.

The carbon-based material of the invention differs from the carbon-based materials of the prior art by the presence of a network of pores, at least 10% of which are mesoporous, preferably more than 20%, and by a total pore volume: 0.4-1 cm$^3$/g, preferably 0.5-1 cm$^3$/g (measured by the dry impregnation or BET method), a total BET specific surface of less than 1000 m$^2$/g and an external specific surface of the sample of less than 300 m$^2$/g.

The term "carbon monolith" is understood to mean a material formed of a single block composed essentially of carbon atoms.

The material of the invention is characterized by a full capacitance by weight of greater than or equal to 75 F/g, measured in a molar aqueous $H_2SO_4$ solution.

The full capacitance by weight is the capacitance by weight of the material measured on the material filled with electrolyte. It is measured after immersion of the material in an electrolyte solution. It varies according to the electrolyte used and in particular it depends on the density of the electrolyte.

A further subject matter of the invention is a process for producing a carbon-based material of the invention, this process comprising a stage of heating a xerogel as described above at a temperature of between 700 and 1050° C. for a period of time of between 5 and 8 hours.

Advantageously, this heating operation is carried out under a nitrogen atmosphere. This results in a carbonization of all the components of the xerogel. The material undergoes a reduction in volume and exists in the form of a monolith of high mechanical strength, which allows it to be machined, in particular in order to produce electrodes. Such electrodes, which do not comprise a binding material, are, at equal volume, of higher capacitance than the electrodes obtained from a powder.

According to an alternative form of the invention, this carbon-based material can, if desired, be reduced to a powder and employed in all the usual applications of electrically conductive carbons, in particular as filler in plastics for the production of electrically conductive components. Mention may be made, for example, of automobile bodywork components which have to be painted by electrostatic painting.

Another subject matter of the invention is the use of a carbon-based material as described above in producing electrodes.

EXPERIMENTAL PART

I—Synthetic Protocol

1—Preparation of the Xerogel

The organic gels result from the polycondensation of resorcinol with formaldehyde in the presence of latex particles.

The resorcinol/formaldehyde (R/F) molar ratio and the resorcinol/water (R/W) ratio by weight were set respectively at 0.5 and 0.4.

The formaldehyde employed is in the form of an aqueous solution (stabilized in the presence of 10 to 15% of methanol); the amount of water present in it is taken into account in the total volume of water present in the formulation and thus in the R/W ratio.

The resorcinol (10.204 g, supplied by Acros, 98% quality) is first dissolved in the distilled water. The aqueous formaldehyde solution (Riedel de Haën, as a 36.5% solution) is subsequently added: 14.944 g.

The content of latex particles (Latex Perbunan®RN-2890) which are added to the system is defined by the ratio:

$$\frac{W_L}{W_L + W_R + W_F}$$

This calculated weight represents the weight of latex particles and not the overall weight of latex solution. Tests were carried out with the following three latex contents: 5, 10 and 25%.

The pH is subsequently adjusted to pH 5.5 or 6.5 by addition of a few drops of a sodium carbonate solution (5M and/or 1M).

The final mixture is placed in test tubes, which are subsequently sealed and then placed in an oven at 90° C. for 1 day. The gels obtained are washed by immersing them in distilled water for 2 h, so as to remove the traces of reactants still present.

They are subsequently placed in a tubular oven at 85° C. for 6 h, and under nitrogen (10 l/min) for a period of time which can vary from 1 day to 7 days.

2—Preparation of the Carbon-Based Material

The dried gels (xerogels formed of RF+latex) are subjected to pyrolysis at 800° C. under a nitrogen stream of 10 l/min.

Each product is characterized by its latex content and its gelling pH.

II—Measurement of the Capacitances and Energy Densities

The capacitances of the carbon-based materials of the invention were characterized in an electrochemical device comprising three electrodes, in particular by chronopotentiometry (1 A/g in aqueous medium and 0.5 A/g in organic medium). Their capacitance was measured and a charge/discharge curve was produced for each of these materials in an aqueous electrolyte and in a nonaqueous electrolyte. The charge and discharge curves were obtained by applying a constant current impulse and by monitoring the voltage response over time using a VersaStat (EG&G) potentiometer with a computer interface (IBM). The EG&G Model 270 software was used for the wave function application and the data acquisition. The capacitance was measured in farads (F) and the resistance of the cell in ohms from the charge/discharge curve using conventional procedures and the equation: $C=It/(V_1-V_2)$.

The aqueous electrolyte is a 1M $H_2SO_4$ solution, while the organic electrolyte is a solution of sodium perchlorate in acetonitrile: 2M $NaClO_4$+ACN.

The working electrode is composed of a platinum mesh within which is placed the monolithic carbon to be analyzed (of known weight and known surface area). The counterelectrode used is made of platinum and the reference electrode is a saturated calomel electrode in aqueous medium and an electrode at the potential limits in organic medium.

The energy densities were measured in accordance with the protocol described in J. R. Miller and A. F. Burke "Electric vehicle capacitor test procedure manual", 1994 DOE/ID10491, pp. 21-25.

III—Comparison of the Performances

The specific capacitance, measured with respect to the dry weight of carbon, which gives simply an idea of the performance, and the specific capacitance estimated with respect to the true weight involved, namely the weight of carbon impregnated with electrolyte (true or actual capacitances), are singled out.

1—Capacitance in Aqueous and Organic Media

The capacitance estimated with respect to the dry weight of carbon and then with respect to the weight filled with 1M sulfuric acid, for the carbon originating from the RF+5% Latex system (pH 6.5), is compared with that of the carbon originating from the equivalent conventional RF (same R/F and R/W ratio and same pH but no latex).

The results are summarized in table 1.

The two carbons have an identical R/W ratio but their capacitive properties are different; the latex acts on the textural properties which govern the capacitive behavior.

TABLE 1

Actual and specific capacitances with respect to the pore volume of dry carbon.

| Samples | RF system | RF + Latex system |
|---|---|---|
| Capacitance (dry carbon) (F/cm$^3$ pv ± 5 F/cm$^3$ pv) | 148 | 194 |
| Density | 0.67 | 0.76 |
| Actual capacitance (carbon filled with 1M H$_2$SO$_4$) (F/g ± 3 F/g) | 68 | 85 |

Measured by immersion of the carbon electrode in 1M H$_2$SO$_4$.

The density and the capacitance by volume of the carbon xerogel initially comprising latex are observed to increase.

Once filled with electrolyte, the RF+Latex (5%) system is more advantageous due to its lower pore volume, which reduces the amount of working electrolyte.

The results of the characteristics in an organic medium are presented in table 2.

TABLE 2

Actual and specific capacitances with respect to the pore volume of dry carbon.

| Type of carbon | RF system | RF + Latex system |
|---|---|---|
| Capacitance (F/cm$^3$ pv ± 5 F/cm$^3$ pv) (dry carbon) | 107 | 157 |
| Density | 0.67 | 0.76 |
| Actual capacitance (carbon filled with ACN + 2M NaClO$_4$) (F/g ± 3 F/g) | 53 | 65 |

Measured by immersion of the carbon electrode in ACN + 2M NaClO$_4$.

In this second example, the capacitance of the carbon resulting from the RF+Latex system with respect to the pore volume is improved by comparison with that of its latex-free homolog. The carbon resulting from the RF+Latex system is thus markedly more effective.

2—Changes in the Textural and Capacitive Properties (1M H$_2$SO$_4$) as a Function of the Initial Content of Latex in the Gels The same protocol is followed as in I, the amount of latex being varied: 0% (RF system); 5% (RF-L0.05 system); 10% (RF-L0.1 system), and gelling pH being varied.

The results are set out in tables 3 and 4.

a—Materials Produced at pH 6.5

TABLE 3

Change in the capacitances as a function of the initial latex content at pH 6.5.

| Samples | RF system | RF-L0.05 system | RF-L0.1 system |
|---|---|---|---|
| Latex content | 0 | 5% | 10% |
| Capacitance (dry carbon) (F/cm$^3$ pv ± 5 F/cm$^3$ pv) | 148 | 194 | 208 |
| Density | 0.67 | 0.76 | 0.85 |
| Actual capacitance (carbon + 1M H$_2$SO$_4$) (F/g ± 3 F/g) (filled with electrolyte) | 67 | 85 | 82 | b—Materials Produced at pH 5.5

TABLE 4

Change in the capacitances by volume (calculated with respect to the weight of dry carbon) as a function of the initial latex content at pH 5.5.

| Samples | RF system | RF-L0.05 system | RF-L0.1 system |
|---|---|---|---|
| Latex content | 0 | 5% | 10% |
| Capacitance (dry carbon) (F/cm$^3$ pv ± 5 F/cm$^3$ pv) | 83 | 94 | 98 |
| Density | 0.39 | 0.42 | 0.49 |

In the two preceding tables, it may be observed that the density always increases with the initial latex content and likewise for the capacitance by volume.

The presence of the latex brings about a reduction in a portion of the "dead" pore volume (where no role is played by the electrolyte in the electrochemical processes), and parallel with the achievement of a good capacitance performance: there is thus optimization of the supercapacitive properties per unit of pore volume.

IV—Measurement of the Mesopore Volume and of the BET Specific Surface

The specific surface and the pore size distribution were analyzed by nitrogen adsorption on a Micromeritics Gemini device and by mercury porosimetry on a Micromeritics Autopore II 9220 device.

These measurements are carried out on the materials produced at pH 6.5.

TABLE 5

Specific surface and mesopore volume of the various carbons.

| Samples | $S_{BET}$ (m$^2 \cdot$g$^{-1}$) | Mesopore vol. (cm$^3 \cdot$g$^{-1}$) |
|---|---|---|
| RF system | 803 ± 3 | 0.96 |
| RF-L0.05 system | 708 ± 3 | 0.68 |
| RF-L0.1 system | 643 ± 3 | 0.55 |

V—X-Ray Diffractograms of the Various Carbon Xerogels

Use is made of a PW 1830 Panalytical X-ray device:
Type of detector: linear
Operating voltage and strength: 135 W 45 kV, 30 mA
Type of X-ray source: Cu An additional carbon-based material is prepared from a latex comprising a high content of nitrile group, with 5% of Synthomer 6617 latex (40% ACN), prepared at pH 6.5.

Figure 1A:
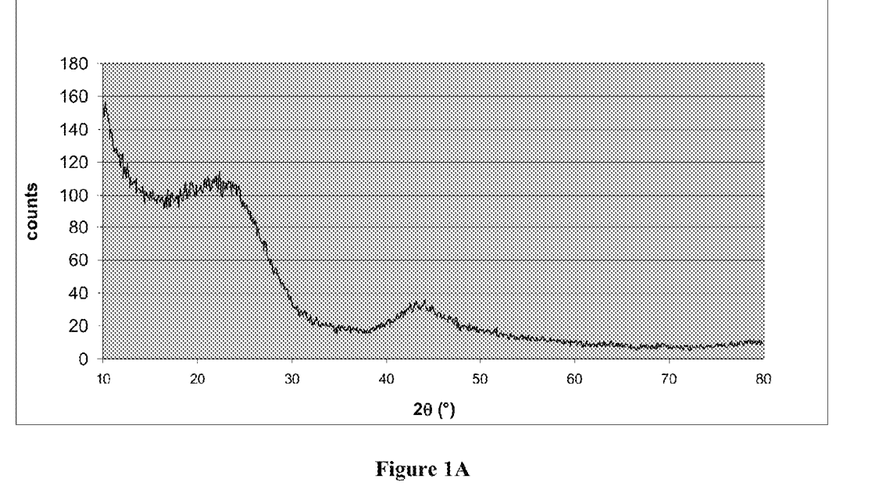
FIG. 1A: X-ray diffractogram of the carbon resulting from the RF system prepared at pH=5.5
Figure 1B:
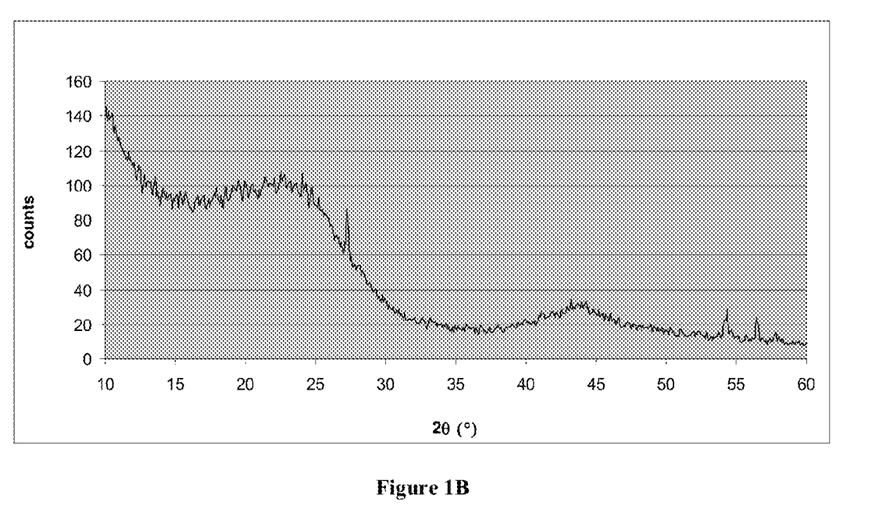
FIG. 1B: X-ray diffractogram of the carbon resulting from the RF-latex (25%) system prepared at pH=5.5
Figure 2A:
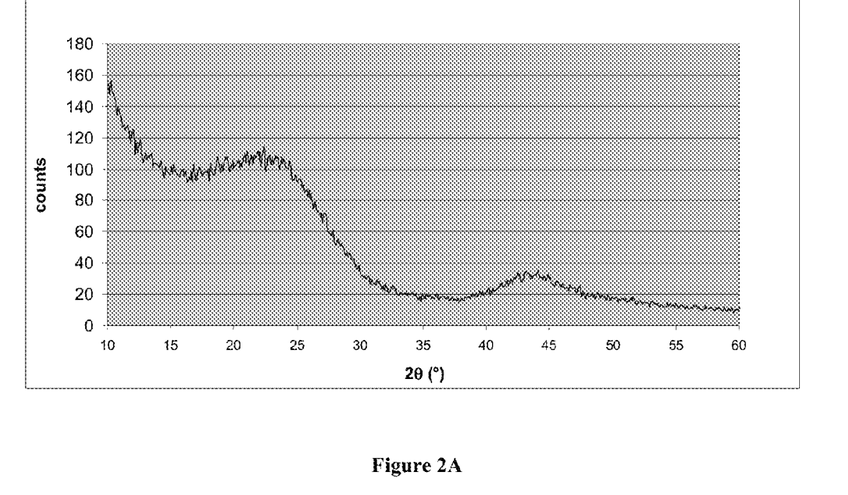
FIG. 2A: X-ray diffractogram of the carbon resulting from the RF system prepared at pH=6.5
Figure 2B:
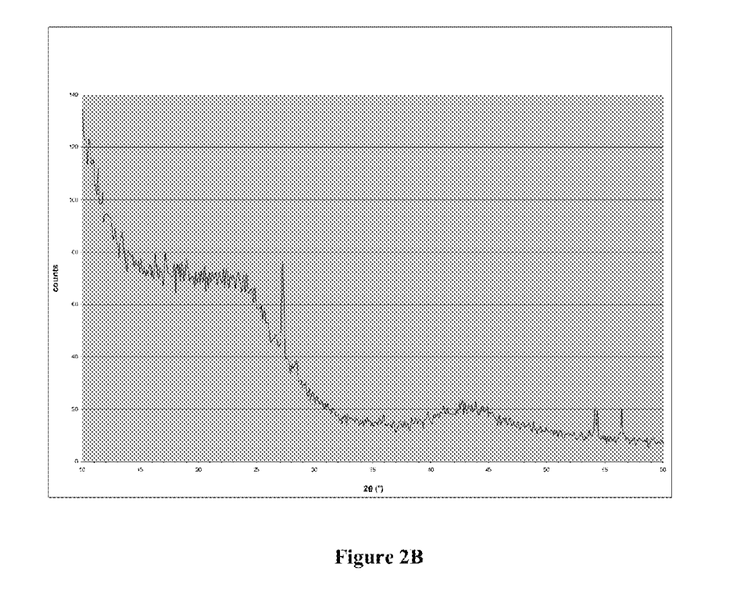
FIG. 2B: X-ray diffractogram of the carbon resulting from the RF-latex (5%) system prepared at pH=6.5
Figure 2C:
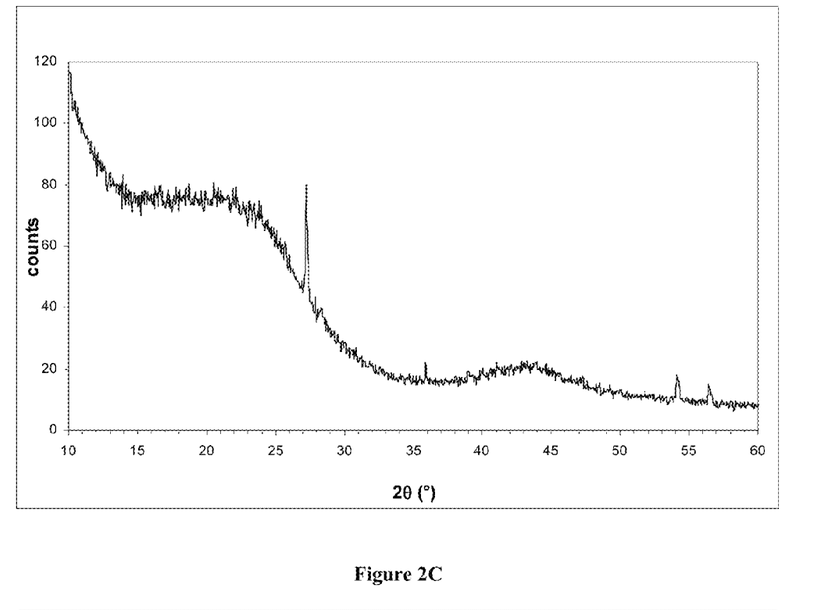
FIG. 2C: X-ray diffractogram of the carbon resulting from the RF-latex (10%) system prepared at pH=6.5
Figure 2D:
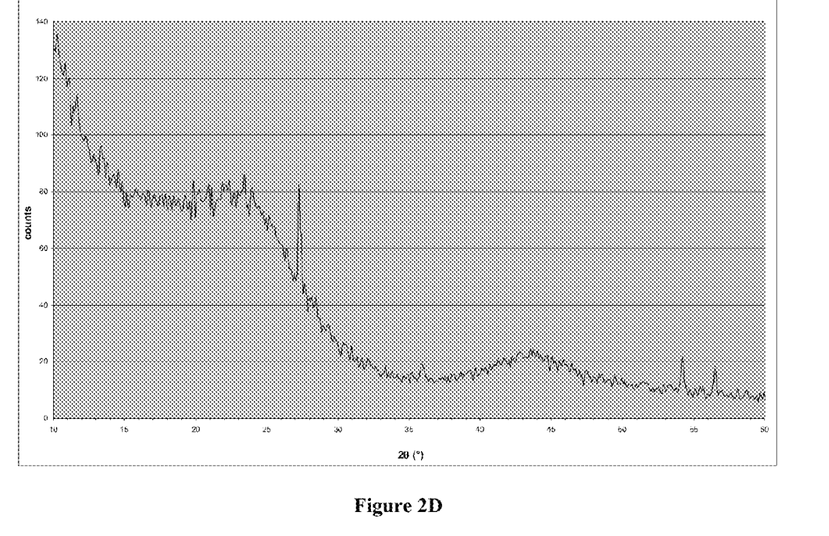
FIG. 2D: X-ray diffractogram of the carbon resulting from the RF-latex (5%) system prepared at pH=6.5 with a latex comprising a high content of nitrile group (40% ACN, Synthomer 6617).

The carbon xerogels originating from conventional RF gels are completely amorphous carbons (FIGS. 1A and 2A). It may be observed, on the 1B, 2B and 2C diffractograms, that the initial presence of latex generates graphite regions in the carbons; specifically, characteristic lines appear on the spectra. These are carbon residues originating from the latex particles which are arranged in the form of sheets.

VI—Comparative Example

A xerogel and a carbon-based material are prepared according to the same protocol as above, the latex being replaced with a styrene latex.

A—Preparation of the Xerogel

The gel results from the polycondensation of resorcinol with formaldehyde in the presence of latex particles.

The resorcinol/formaldehyde (R/F) molar ratio and the resorcinol/water (R/W) ratio by weight were set respectively at 0.5 and 0.4.

The formaldehyde employed is in the form of an aqueous solution (stabilized in the presence of 10 to 15% of methanol); the amount of water present in it is taken into account in the total volume of water present in the formulation and thus in the R/W ratio.

The resorcinol (30.62 g, supplied by SAFC, 98% quality) is first dissolved in the distilled water. The aqueous formaldehyde solution (Merck, as a 37% solution) is subsequently added: 50.05 g.

The content of latex particles (Latex Synthomer® 9076 styrene latex) which are added to the system is defined by the ratio:

$$\frac{W_L}{W_L + W_R + W_F}$$

This calculated weight represents the weight of latex particles and not the overall weight of latex solution. The test is carried out with a latex content of 5%.

The pH is subsequently adjusted to pH 6.5 by addition of a few drops of a sodium carbonate solution (1M).

The final mixture is placed in test tubes, which are subsequently sealed and then placed in an oven at 90° C. for 1 day. The gels obtained are washed by immersing them in distilled water for 2 h, so as to remove the traces of reactants still present.

They are subsequently placed in an oven at 85° C. for 6 h.

B—Preparation of the Carbon-Based Material

The dried gels (RF+styrene latex xerogels) are subjected to pyrolysis at 800° C. under a nitrogen stream of 10 l/min.

C—Results

The properties of the product obtained according to the process of the invention with 0.05% of nitrogen-based latex and at pH 6.5 (RF-L0.05) and of the product obtained from the styrene latex (0.05%) at pH 6.5 (RF-LStyr0.05) are compared in the table below.

|  | RF-L0.05 system | RF-LStyr0.05 system |
|---|---|---|
| Density (±0.02) | 0.80 | 0.73 |
| Pore volume ($cm^3/g \pm 0.03\ cm^3/g$) | 0.51 | 0.70 |
| Actual capacitance (carbon + $H_2SO_4$) (F/g ± 5 F/g) | 120 | 85 |
| Energy density (Wh/kg) carbon + electrolyte | 3.5 | 2.8 |

What is claimed is:

1. A carbon-based material obtained by pyrolysis of a xerogel of at least one hydrophilic polymer and of at least one nitrogen-based latex, the polymer and the latex being cocrosslinked, characterized in that it is in the form of a monolith formed of carbon comprising from 0.1 to 20% by weight of graphite, with respect to the total weight of the material, and by the presence of at least three of the following peaks in the X-ray diffreaction spectrum measured on a diffractometer in 0-0 configuration equipped with a copper anticathode and expressed in terms of Bragg 2θ angle:
   2θ angle
   26.2 (*)
   54.4 (*)
   56.1 (**)
   ** values ±0.5°
   *value ±1°.

2. The carbon-based material as claimed in claim 1, which comprises a network of pores, at least 10% of which are mesoporous, and a pore volume of between 0.4 and 1 $cm^3/g$.

3. The carbon-based material as claimed in claim 1, which exhibits a full capacitance by weight of greater than or equal to 75 F/g, measured in a molar aqueous $H_2SO_4$ solution.

4. A process for producing a carbon-based material as claimed in claim 1, this process comprising a stage of heating a xerogel of at least one hydrophilic polymer and of at least one nitrogen-based latex at a temperature of between 700 and 1050° C. for a period of time of between 5 and 8 hours.

5. The process as claimed in claim 4, in which the xerogel is obtained by the process comprising the stages of:
   (i) mixing, in aqueous solution, the monomers participating in the composition of the hydrophilic polymer;
   (ii) introducing the latex and mixing;
   (iii) adding a basic aqueous solution, so as to adjust the pH to a value of between 5.5 and 7.5;
   (iv) gelling;
   (v) drying.

6. The process as claimed in claim 5, in which the total amount of water is chosen in order to have a ratio by weight $W_R/W_W \leq 1.4$, with $W_R$ the weight of the monomers of polyhydroxybenzene type and $W_W$ the weight of water.

7. The process as claimed in claim 5, in which the gelling takes place by heating at constant volume, preferably under pressure.

8. The process as claimed in claim 5, in which the gel is dried by convective drying.

9. A gel used in the process as claimed in claim 4, of at least one hydrophilic polymer of the polyhydroxybenzene/formaldehyde type and of at least one nitrogen-based latex, the polymer and the latex being cocrosslinked, in which the ratio by weight of the latex particles ($W_L$) to the sum of all the constituents $W_L+W_R+W_F$, with $W_R$=weight of polyhydroxybenzene and $W_F$=weight of formaldehyde, is within the following limits:

$$1 \leq \frac{W_L}{W_L + W_R + W_F} \leq 40\%.$$

10. The gel as claimed in claim 9, in which the polyhydroxybenzene is chosen from resorcinol and a mixture of resorcinol with another compound chosen from catechol, hydroquinone and phloroglucinol.

11. The gel as claimed in claim 9, in which the nitrogen-based latex comprises an amount of nitrogen-based monomers which represents between 2 and 90 mol %, with respect to the combined monomers of the latex.

12. The gel as claimed in claim 9, in which the latex is chosen from: nitrile rubbers.

13. The gel as claimed in claim 9, in which the molar ratio of the polyhydroxybenzene, denoted R, to the formaldehyde, denoted F, is $0.4 \leq R/F \leq 0.6$.

14. The gel as claimed in claim 9, in which the molar ratio of the polyhydroxybenzene, denoted R, to the formaldehyde, denoted F, is $0.45 \leq R/F \leq 0.55$.

15. An electrode comprising the carbon-based material as claimed in claim 1.

16. An electrically condictive component comprising a plastic, wherein the plastic includes the carbon-based material as claimed in claim 1 as a filler.

* * * * *

UNITED STATES PATENT AND TRADEMARK OFFICE
CERTIFICATE OF CORRECTION

PATENT NO. : 9,017,579 B2  Page 1 of 1
APPLICATION NO. : 12/934243
DATED : April 28, 2015
INVENTOR(S) : Sonntag et al.

It is certified that error appears in the above-identified patent and that said Letters Patent is hereby corrected as shown below:

Title page, Item
(75) Inventors: "Barthenheim" should read --Bartenheim--.

In the claims:

Column 12,
Line 39, "diffreaction" should read --diffraction--.

Column 14,
Line 19, "condictive" should read --conductive--.

Signed and Sealed this
Fifth Day of January, 2016

Michelle K. Lee
*Director of the United States Patent and Trademark Office*